(12) United States Patent
Habets et al.

(10) Patent No.: US 6,372,139 B1
(45) Date of Patent: Apr. 16, 2002

(54) CIRCUIT PURIFICATION FOR THE PAPERMAKING INDUSTRY

(75) Inventors: Leonard Hubertus Alphonsus Habets, Sneek; Ronald Mulder, Alkmaar, both of (NL)

(73) Assignee: Paques Water Systems B.V., Balk (NL)

( * ) Notice: Subject to any disclaimer, the term of this patent is extended or adjusted under 35 U.S.C. 154(b) by 0 days.

(21) Appl. No.: 09/705,889

(22) Filed: Nov. 6, 2000

(30) Foreign Application Priority Data

Nov. 4, 1999 (NL) .............................................. 1013491

(51) Int. Cl.$^7$ ................................................. C02F 3/30
(52) U.S. Cl. ........................ 210/605; 210/607; 210/612; 210/622; 210/650; 210/928; 162/29
(58) Field of Search ................................ 210/605, 607, 210/612, 613, 620, 621, 623, 630, 650, 687, 800, 928, 622; 162/29, 41

(56) References Cited

U.S. PATENT DOCUMENTS 2,382,010 A * 8/1945 Hodges
4,374,027 A * 2/1983 Severeid et al.
4,735,725 A * 4/1988 Reischl et al.
5,223,140 A    6/1993 Rutherford et al.
5,395,527 A * 3/1995 Desjardins
5,849,197 A * 12/1998 Taylor et al.
5,902,484 A * 5/1999 Timpany
6,071,380 A * 6/2000 Hoffman

FOREIGN PATENT DOCUMENTS

DE        4042224    * 7/1992
EP      0 494 399      7/1992

* cited by examiner

Primary Examiner—David A. Simmons
Assistant Examiner—Fred Prince
(74) Attorney, Agent, or Firm—Young & Thompson

(57) ABSTRACT

A method for the treatment of process water or effluent from a papermaking process, in which this water is subjected to at least one anaerobic purification step, an aeration step and a solids separation step and the water is then returned to the production process, and at least two treated water streams of different quality, which originate from a different combination of purification steps, are returned to different points in the production process.

12 Claims, 2 Drawing Sheets

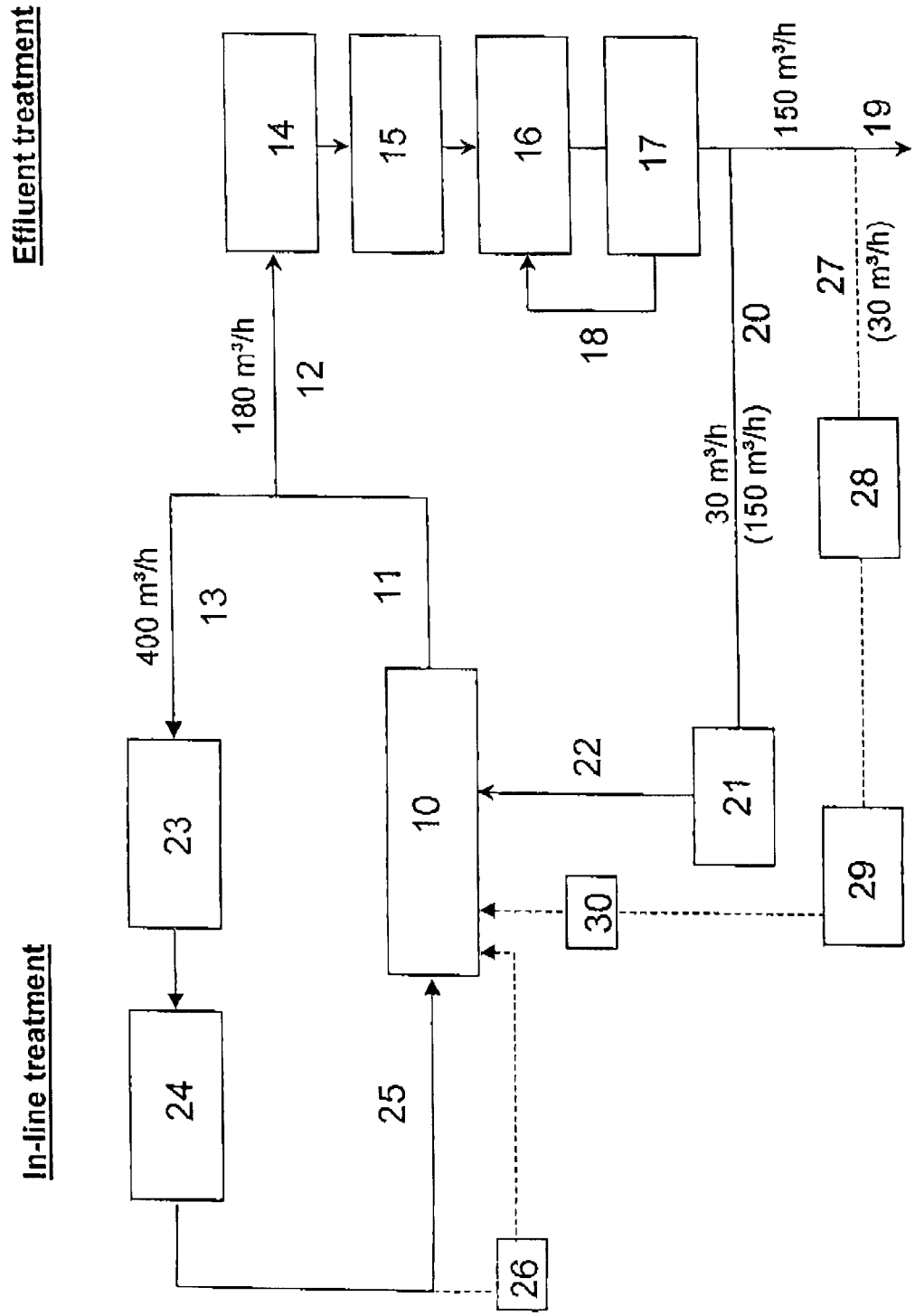

CIRCUIT PURIFICATION FOR THE PAPERMAKING INDUSTRY

FIELD OF THE INVENTION

The invention relates to a process for treating process water from the paper-making industry, in which at least one anaerobic purification and an aeration step are used.

BACKGROUND OF THE INVENTION

Within the papermaking industry, there is an increasing trend towards reducing water consumption. There are various reasons for this, such as reducing the consumption of fresh water, reducing the amounts of waste water and limiting heat losses.

A drawback of reduced water consumption is that the concentrations of contaminants increase. To prevent problems with substantially closed circuits, it is increasingly common to use circuit purification. A circuit purification of this nature preferably comprises a biological purification which is used to remove dissolved organic substances, if necessary, followed by a sand filter for removing excess suspended matter.

Prior to the purification, the process water is cooled from 55° C. to 35° C., since it has hitherto been assumed that the bacteria thrive most successfully at this temperature. These mesophilic bacteria are unable to survive a temperature of higher than 44° C., A purification of this nature is used at Zülpich Papier in Germany. The process comprises an anaerobic purification step, followed by an aerobic purification step and a sand filtration step. The aerobic purification comprises an activated sludge process, comprising aerated basins containing biomass followed by secondary settling tanks, in which the biomass is separated off and is returned to the aerated basins.

The purification process has been simplified at Kappa Graphic Board in Hoogezand, the Netherlands, where a biomass has been grown which achieves a high level of activity at a temperature of approx. 55° C. As a result, the cooling can be dispensed with and the higher activity of the thermophilic bacteria even allows the size of the reactors to be reduced.

To make paper, in principle 200 liters of water is required per kilogram of paper produced. Circulation processes generally reduce this amount to less than 20 l/kg for white paper grades and less than 10 l/kg or often less than 5 l/kg for packaging paper grades.

Obviously, quality plays an important role in the reuse of the water. If all the surplus water could be recovered to drinking water quality, it could all be reused without problems and there would be no waste water. However, to meet this target the costs of purification are extremely high, since large quantities of water would have to be treated using membrane installations (UF and RO).

SUMMARY OF THE INVENTION

The invention relates to the use of various purification steps in succession and, if appropriate, in parallel, resulting in different qualities of purified effluent which can be reutilised at different points in a papermaking factory. For example, it is possible to supply a quantity of water which has passed through an anaerobic purification and an aerobic recovery step but from which suspended materials have not yet been removed. This water is in principle suitable as make-up water or dilution water at those areas in the factory where suspended material does not cause problems (for example in the pulper). Some of this water could undergo an additional treatment in which the suspended material is removed, for example by means of flotation or sedimentation. This water is suitable for use where amounts of suspended solids (SS) of up to 100 mg/l do not cause problems, for example for certain sprays. A further increase in quality can be achieved by positioning a sand filter downstream of the flotation or settling units. The result is water with an SS<10 mg/l, which is suitable for the finer sprays.

In the process of the invention, the solids separation step comprises a flotation and/or sedimentation and/or sand filtration and/or membrane filtration, preferably more than one of these separation steps. These different separation steps can be arranged in line, optionally with part of the each effluent being fed to the next separation step, and part being directly returned to specific points in the paper-making process, in accordance with the required water quality at that specific point.

The anaerobic treatment and/or the aerobic treatment, preferably both, may be incorporated in two or more different treatment lines. Preferably, two treated water streams have a volumetric ratio of 1:9 to 9:1. Suitably one of two treated streams additionally undergoes a sand filtration and/or membrane filtration, before being returned to the paper-making process Preferably at least one of the aeration steps has a hydraulic residence time of 1 to 8 hours, especially 2 to 6 hours. The anaerobic and/or the aerobic treatment may be partly or wholly carried out under mesophilic or thermophilic conditions, in particular at a temperature of 30 to 60° C., preferably 40 to 60° C. Advantageously the anaerobic purification step and/or the aeration step may be carried out in high tanks with a height of 16 to 24 m and 8 to 16 m, respectively. Aeration is carried out using conventional means, for example using injectors.

Finally, some of the biologically purified water can also be purified further with the aid of a UF membrane in order to supply a quantity of high-quality water which is completely free of suspended solids and in which the larger molecules (relating to the colour) have been removed. This water is suitable, for example, for use in high-pressure cleaners, edge trimmers and for making up chemicals. In this way, all the required qualities are provided, while the additional purification steps are kept as small as possible, in order to limit investment costs.

The use of the higher water temperature causes a higher biological activity and also promotes the flow through the membrane, so that the membrane surface area can be smaller. Furthermore, it has been found that the results of a UF treatment are considerably improved if this treatment is preceded by an anaerobic purification step, through which the smaller molecules have already been removed.

BRIEF DESCRIPTION OF THE DRAWINGS

FIGS. 1 and 2 each depict a circuit purification for a paper mill according to the invention.

DETAILED DESCRIPTION OF THE INVENTION

Figure 1:
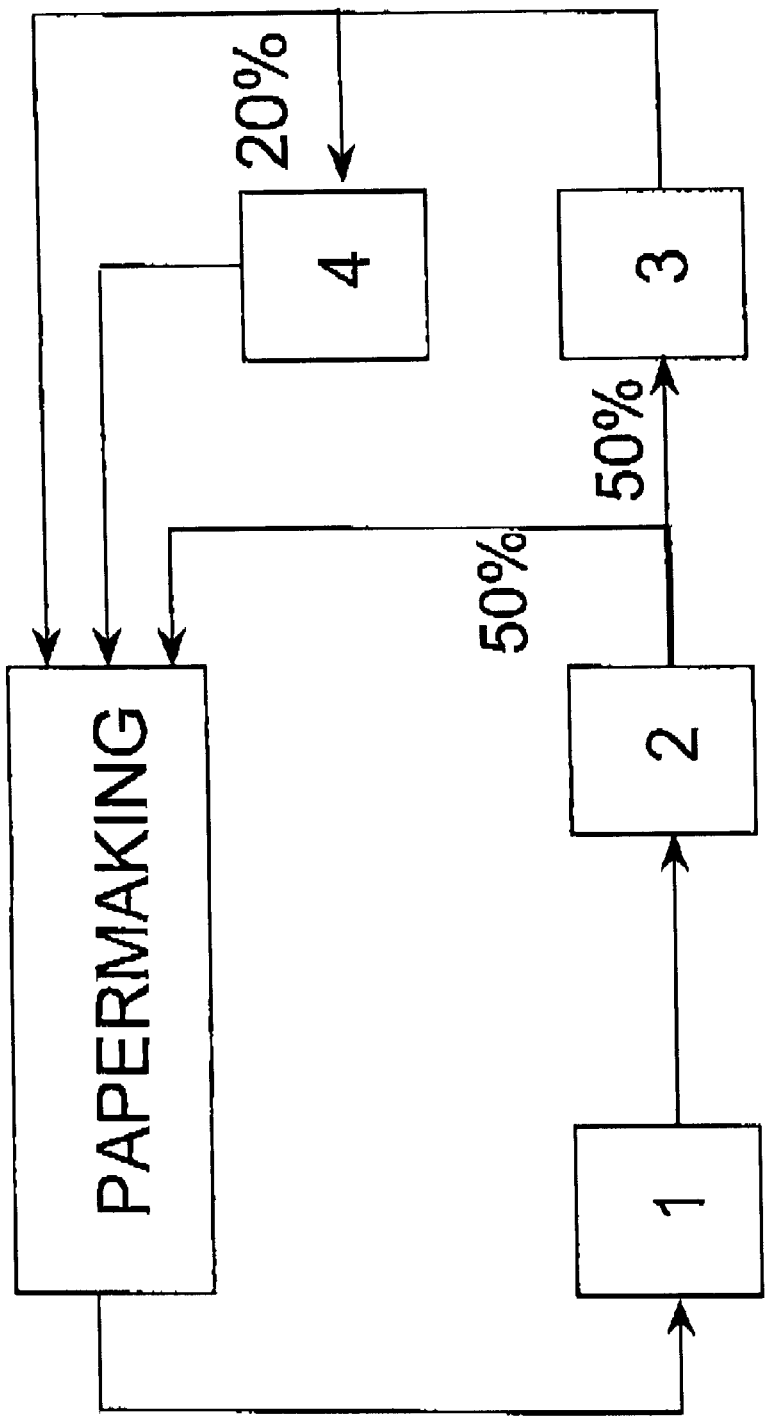

FIG. 1 illustrates an example of a circuit purification for a papermaking factory. This figure serves as an example of an embodiment of the present invention. Other embodiments with, for example, a different distribution of the streams also lie within the scope of the invention.

In FIG. 1, (1) is a thermophilic anaerobic purification, (2) is an aerated tank, (3) is a Dortmund tank or Dissolved Air flotation, and (4) is an ultrafiltration unit. A Dortmund tank is a round sludge settling tank, in which the conical base has an angle of inclination of approximately 60 degrees, so that there is no need for a scraper mechanism to move the sludge towards the centre of the base.

FIG. 2 illustrates a circuit purification for a paper mill according to example described below. Paper production facility (10) produces a clarified water stream (11) which is split into two partial streams (12) and (13). A cooling unit (14), an anaerobic reactor (15) and an aeration basin (16) are arranged in line for the treatment of stream (12). Downstream of the aeration basin (12), a sedimentation tank (17) is provided with return activated sludge line (18 ). The effluent from the sedimentation unit is divided in a discharge stream (19) and a recycle stream (20), which leads to a sand filtration unit (21) and back to the paper mill through stream (22). Second stream (13) leads to an anaerobic reactor (23) and an aeration tank (24) which produces treated stream (25) which is returned to the paper mill at a different point from (22). A optional membrane filtration unit (26) can be provided as a side stream to (25). An optional further return stream (27) leads to a softening unit (28), a sand filtration unit (29), a membrane filtration unit (30) and back to yet another point in the paper mill.

EXAMPLE

A paper mill produces 900 tons per day (tpd) of semi-finished product for the manufacturing of corrugated boxes on the basis of waste paper as raw material. The effluent discharge has been limited by the water authorities to 150 m$^3$/h, which corresponds with 4 m$^3$ per ton of paper produced.

For a production increase from 900 to 1500 tpd, more water needed to be circulated, but the process water became too much contaminated and started to cause scaling and odours. The solution for the problem is represented in FIG. 2. It can be seen in this figure that besides the existing effluent treatment (14–15–16–17), an in-line anaerobic (23) and aerobic treatment (24) has been added, which treats 400 m$^3$/h of process water. This plant can operate at mesophilic as well as at thermophilic temperatures, so that no cooling of process water is required. The aerobic treatment consists of just one tank without solids retention. Since the effluent of this tank can contain 400 mg/l of Suspended Solids (SS), the water is mainly used as make-up water (25) for the pulpers. In this way, the in-line plant acts purely for the reduction of dissolved organic material and water hardness.

Furthermore, the existing effluent treatment was extended with a sand filtration (21) to polish part of the treated water, so that this can be returned to the production process as pump sealing water After the sand filtration the SS are less than 10 mg/l. The next stage will be to add membrane filtration for part of the flows that are returned to the process (26) and for part of the effluent that is currently discharged (27–28–29–30). In this way, a quality of water suitable for dilution of paper making chemicals as well as for spray water can be produced. The final goal is to arrive at 0 m$^3$ of effluent (19) per ton of paper produced in order to meet future legislation.

What is claimed is:

1. A process for the treatment of process water or effluent from a papermaking process, comprising subjecting the process water to a plurality of purification steps comprising at least one anaerobic purification step, at least one aeration step downstream of said anaerobic purification step, at least one solids separation step downstream of said aeration step, and returning effluents issuing from at least two of said purification steps, having different quality and originating from a different combination of purification steps, to different points in the papermaking process.

2. The process according to claim 1, wherein the solids separation step comprises a flotation and/or sedimentation and/or sand filtration and/or membrane filtration.

3. The process according to claim 1, wherein the aeration step has a hydraulic residence time of 1 to 8 hours.

4. The process according to claim 1, wherein the purification takes place at a temperature of 30 to 60° C.

5. The process according to claim 1, wherein at least one of the anaerobic purification step and aeration steps is carried out in high tanks with a height of 16 to 24 m and 8 to 16 m, respectively.

6. The process according to claim 1, wherein the aeration is carried out using injectors.

7. The process according to claim 1, wherein settlement is carried out in a Dortmund tank.

8. The process according to claim 1, wherein a membrane filtration is carried out in UF modules.

9. The process according to claim 1, wherein at least two water streams are subjected to an anaerobic purification step and an aeration step, and one of which additionally undergoes a sand filtration and/or membrane filtration.

10. The process according to claim 9, wherein two treated water streams have a volumetric ratio of 1:9 to 9:1.

11. The process according to claim 9, wherein at least three effluents water streams are returned to different points in the papermaking process.

12. The process according to claim 1, wherein the anaerobic purification step and the aerobic purification step each take place in a distinct reactor.

\* \* \* \* \*